United States Patent
Keuten et al.

(10) Patent No.: US 10,031,030 B2
(45) Date of Patent: Jul. 24, 2018

(54) TEMPERATURE SENSOR ARRANGEMENT WITH AN ELECTRICALLY AND THERMALLY INSULATING COVERING

(71) Applicant: CONTI TEMIC MICROELECTRONIC GMBH, Nuremberg (DE)

(72) Inventors: Matthias Keuten, Altdorf (DE); Andreas Voegerl, Parsberg (DE); Juergen Henniger, Erlanfen-Dechsendorf (DE); Matthias Wieczorek, Neunkirchen am Sand (DE); Lisa-Maria Wittmann, Alesheim (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 235 days.

(21) Appl. No.: 15/023,735

(22) PCT Filed: Sep. 12, 2014

(86) PCT No.: PCT/EP2014/069507
§ 371 (c)(1),
(2) Date: Mar. 22, 2016

(87) PCT Pub. No.: WO2015/039964
PCT Pub. Date: Mar. 26, 2015

(65) Prior Publication Data
US 2016/0231184 A1  Aug. 11, 2016

(30) Foreign Application Priority Data
Sep. 23, 2013 (DE) .......... 10 2013 219 094

(51) Int. Cl.
*G01K 7/00* (2006.01)
*G01K 7/22* (2006.01)
(Continued)

(52) U.S. Cl.
CPC ............. *G01K 7/22* (2013.01); *G01K 1/08* (2013.01); *G01K 1/16* (2013.01); *G01K 2205/00* (2013.01)

(58) Field of Classification Search
CPC .. G01K 7/22; G01K 1/08; G01K 1/16; G01K 7/16; G01K 2205/00
See application file for complete search history.

(56) References Cited

U.S. PATENT DOCUMENTS

| 4,174,512 A | 11/1979 | Blatter |
| 4,420,738 A | 12/1983 | Rehmann et al. |

(Continued)

FOREIGN PATENT DOCUMENTS

| DE | 3044419 A1 | 6/1982 |
| DE | 4108789 A1 | 7/1992 |

(Continued)

*Primary Examiner* — Lisa Caputo
*Assistant Examiner* — Janice M Soto
(74) *Attorney, Agent, or Firm* — Laurence A. Greenberg; Werner H. Stemer; Ralph E. Locher

(57) ABSTRACT

A sensor configuration measures the temperature of a medium in a vehicle. The sensor configuration includes a sensor body and two connecting wires and is completely insulated from the medium. The sensor body is electrically and thermally insulated from the medium by a covering completely surrounding the sensor body and is in heat-conducting contact with the medium substantially through the connecting wires.

7 Claims, 2 Drawing Sheets

(51) Int. Cl.
    *G01K 1/08*     (2006.01)
    *G01K 1/16*     (2006.01)

(56) References Cited

U.S. PATENT DOCUMENTS

| | | | | |
|---|---|---|---|---|
| 4,516,106 | A * | 5/1985 | Nolting | G01K 1/18 338/28 |
| 6,365,424 | B1 * | 4/2002 | Bauer | G01D 11/245 257/690 |
| 7,046,116 | B2 | 5/2006 | Damaschke et al. | |
| 7,798,704 | B2 * | 9/2010 | Bard | G01K 3/06 374/116 |
| 8,752,719 | B2 * | 6/2014 | Geijzendorffer | G01K 11/165 215/11.1 |
| 2004/0101031 | A1 * | 5/2004 | Kotwicki | G01K 1/16 374/185 |

FOREIGN PATENT DOCUMENTS

| | | |
|---|---|---|
| DE | 4339631 A1 | 12/1994 |
| DE | 9218936 U1 | 7/1996 |
| DE | 10052116 A1 | 5/2002 |
| DE | 10322166 A1 | 5/2004 |
| DE | 102010002806 A1 | 9/2011 |
| JP | S5226250 A | 2/1977 |
| JP | S5499483 A | 8/1979 |
| JP | S57116229 A | 7/1982 |
| JP | 2009526976 A | 7/2009 |

* cited by examiner

_(1)_

TEMPERATURE SENSOR ARRANGEMENT WITH AN ELECTRICALLY AND THERMALLY INSULATING COVERING

BACKGROUND OF THE INVENTION

Field of the Invention

The invention relates to a sensor arrangement including a sensor body and two connection wires, for measuring the temperature of a medium in a motor vehicle, in which the sensor body is electrically and thermally insulated from the medium by a covering which completely surrounds the sensor body.

Temperature sensors, in particular for measuring the temperature of media, such as oil or cooling liquid in a motor vehicle, generally change their electrical properties depending on the prevailing temperature. For example, when a sensor component which is composed of carbon or a semiconductor material is heated, the electrical resistance of said sensor component falls. Therefore, the temperature can be determined fairly accurately by measuring the resistance in the region of the large increase. Materials of this kind conduct the current better when they are hot than when they are cold, and are therefore also called NTC (Negative Temperature Coefficient) thermistors. Metals, such as platinum for example, exhibit the opposite effect and are therefore called PTC (Positive Temperature Coefficient) thermistors.

The sensor resistor, which is directly surrounded by medium, is generally connected to a supply voltage by way of its two connections which can be designed as pins or legs. The voltage which is dropped across one sensor resistor is determined and evaluated in a controller.

Heat can be introduced from the medium to the sensor by means of the two connection legs and at the same time by means of the side faces of the sensor module. In this case, that area of the arrangement which transmits heat is large, and therefore the response time of the measurement process is short. However, the risk of a short circuit between the connection legs is high, in particular owing to chips as can quite possibly be produced in a motor or a transmission by friction between the rotating parts.

BRIEF SUMMARY OF THE INVENTION

An object of the present invention is therefore to provide a sensor arrangement for measuring the temperature of a medium in a motor vehicle of the kind cited in the introductory part in such a way that as short as possible a response time is guaranteed together with increased protection against short circuits.

According to the invention, this object is achieved by an arrangement having the features described below.

The sensor arrangement according to the invention substantially comprises a sensor body and connection wires, wherein the sensor body is electrically and thermally insulated from the medium by means of a covering which completely surrounds the sensor body, and said sensor body is in thermally conductive contact with the medium substantially by means of the connection wires. The covering necessarily also surrounds the connection wires to a great extent, at least in the region of the sensor body, as a result of which the risk of a short circuit between the connection wires, in particular owing to chips, is considerably reduced. The sensor signal can be tapped off from the connection wires which are held in an isolated manner in this way and are supplied to an evaluation unit, in particular to a controller, for evaluation purposes.

The covering is composed, in particular, of an electrically and largely thermally insulating material, such as a thermosetting plastic or a thermoplastic for example, wherein the thermal conductivity of these materials is generally in a range of from 0.2 to 0.5 W/m K.

Each connection wire is advantageously electrically conductively connected to a contact base, from which the sensor signal can be tapped off, by means of a separate connection contact. The connection contact can be designed, in particular, as a stamped grid.

In order to improve the response time of the measurement method, that surface of the arrangement which comes into thermally conductive contact with the medium can, in particular, be increased in size by at least one part of at least one connection contact not being surrounded by the covering, and therefore coming into direct thermally conductive contact with the medium.

That surface of the arrangement which comes into thermally conductive contact with the medium can be increased in size, and therefore the response time can be further shortened, in particular by the connection contact establishing thermal contact with the medium by means of an additional apparatus. In particular, the contact surface of the apparatus, which surface is not surrounded by the covering and is therefore in direct thermally conductive contact with the medium, is larger than the contact surface of the connection contact with the medium in this case. For the sake of simplicity, the apparatus can be a part of the connection contact in each case, for example can be integrated into a stamped grid.

The covering can particularly be designed as an encapsulation, a casting or a multipartite housing, for example comprising a cover and a housing lower part.

Depending on the field of use, the sensor can be designed as an NTC (Negative Temperature Coefficient) thermistor, for example which is composed of carbon or a semiconductor material, with a negative temperature coefficient, or as a PTC (Positive Temperature Coefficient) thermistor, in particular which is composed of metal, with a positive temperature coefficient.

BRIEF DESCRIPTION OF THE SEVERAL VIEWS OF THE DRAWING

The present invention is described in more detail with reference to the attached drawings, in which.

DESCRIPTION OF THE INVENTION

Figure 1:
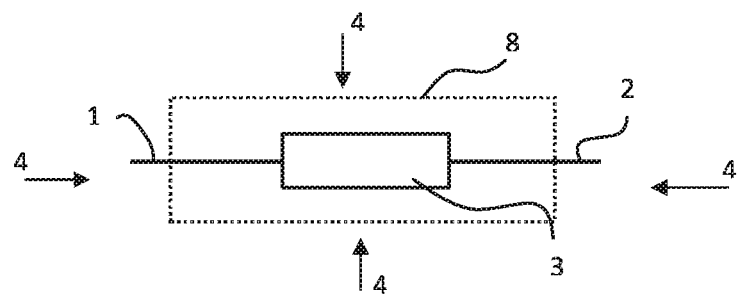
FIG. 1 shows a front view of the arrangement.

FIG. 1 shows a sensor arrangement for measuring the temperature of a medium 4 in a motor vehicle, wherein the sensor comprises a sensor body 3 and two connection wires 1, 2. The sensor body 3 is electrically and thermally insulated from the surrounding medium 4 by means of a covering 8 which completely surrounds the sensor body 3. The sensor body is in thermally conductive contact with the medium substantially by means of the connection wires 1, 2.

The electrically and thermally insulating material of the covering can be a commercially available thermosetting plastic or thermoplastic.

Figure 2:
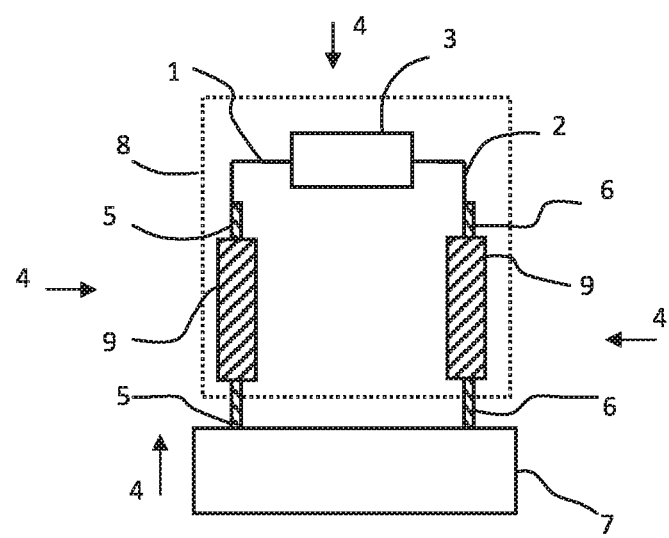
FIG. 2 is a sectional illustration through the arrangement.

FIG. 2 shows a section through the arrangement. Each connection wire 1, 2 is electrically conductively connected to a contact base 7 by means of a separate connection contact 5, 6, wherein the sensor body 3, the connection wires 1, 2 and the associated connection contacts 5, 6 are virtually completely surrounded by the covering 8, and as a result are both thermally and electrically insulated from the medium 4. The connection contacts 5, 6 are designed as stamped grids for example. A sensor signal can be tapped off from the contact base 7.

The risk of a short circuit between the connection wires 1, 2 or between the connection contacts 5, 6, in particular owing to chips as are often produced in a motor or a transmission by friction between the rotating parts, is kept low by virtue of this arrangement.

The connection contacts 5, 6 in FIG. 2 are each in electrically and thermally conductive contact with an apparatus 9 which, for the sake of simplicity, is part of the connection contact 5, 6.

Figure 4:
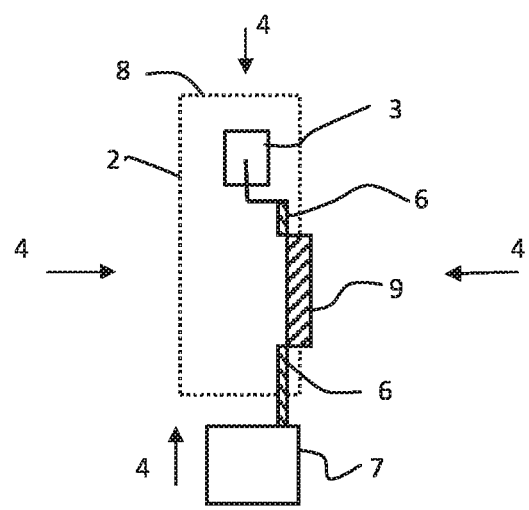
FIG. 4 is a side view of the arrangement.

FIG. 4 shows a side view of the arrangement. In this case, at least one part of the apparatus 9 is not surrounded by the covering and is therefore in direct thermally conductive contact with the medium 4. Since the contact surface of the apparatus 9, which contact surface is free of the covering 8 and is therefore in direct thermally conductive contact with the medium 4, is larger than the contact surface of the connection contact 5, 6 with the medium 4, the area of the arrangement which transmits heat is relatively large. This leads to a relatively short response time of the measurement process. As a result, rapid temperature fluctuations in the medium 4 can also be detected.

Figure 3:
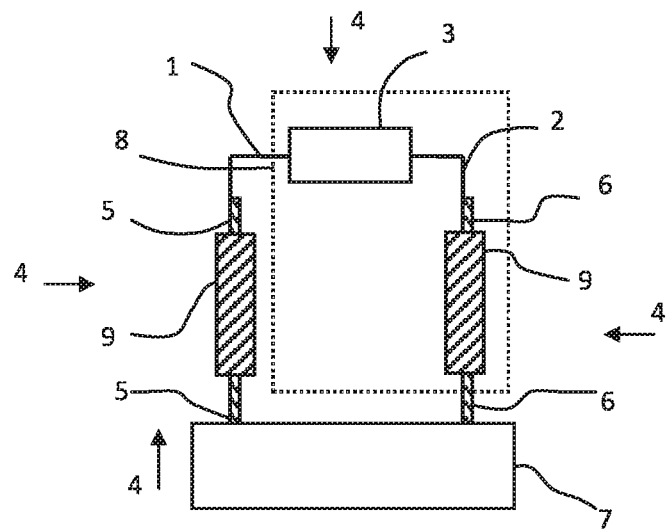
FIG. 3 is a further sectional illustration through the arrangement.

The response time of the measurement process is further reduced by the arrangement in FIG. 3. Since a large part of one of the connection wires 1 and the associated connection contact 5, including the associated apparatus 9, are free of the covering 8, the thermally conductive contact surface of the arrangement 6 with the medium 4 is further increased together with protection against short circuits.

The invention claimed is:

1. A sensor configuration, comprising:
   a sensor body and two connection wires, for measuring a temperature of a medium in a motor vehicle, said sensor body being in thermally conductive contact with the medium through said connection wires;
   a covering completely surrounding said sensor body and electrically and thermally insulating said sensor body from the medium;
   a contact base from which a sensor signal can be tapped off; and
   separate connection contacts each electrically conductively connecting a respective one of said connection wires to said contact base, at least one part of at least one of said connection contacts having a contact surface to be exposed to the medium, said contact surface not being surrounded by said covering and therefore being in direct thermally conductive contact with the medium.

2. The sensor configuration according to claim 1, wherein said electrically insulating covering is composed of a thermosetting plastic or thermoplastic material.

3. The sensor configuration according to claim 1, wherein said connection contacts are constructed as stamped grids.

4. The sensor configuration according to claim 1, which further comprises:
   an apparatus establishing thermal contact of said at least one part of said at least one connection contact with the medium,
   said at least one connection contact having a contact surface; and
   said apparatus having a contact surface not surrounded by said covering, therefore being in direct thermally conductive contact with the medium and being larger than said contact surface of said at least one connection contact.

5. The sensor configuration according to claim 4, wherein said apparatus is a part of each said at least one connection contact.

6. The sensor configuration according to claim 1, wherein said covering is an encapsulation, a casting or a multipartite housing.

7. The sensor configuration according to claim 1, wherein said sensor body is a resistor with a positive or negative temperature coefficient.

* * * * *